(No Model.)
T. B. JEFFERY.
VELOCIPEDE.
No. 355,321. Patented Jan. 4, 1887.
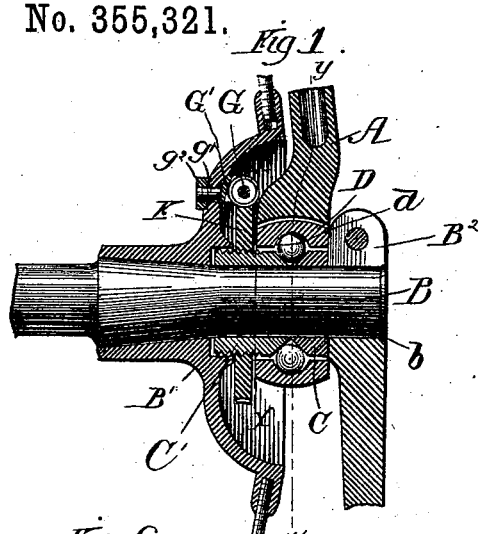
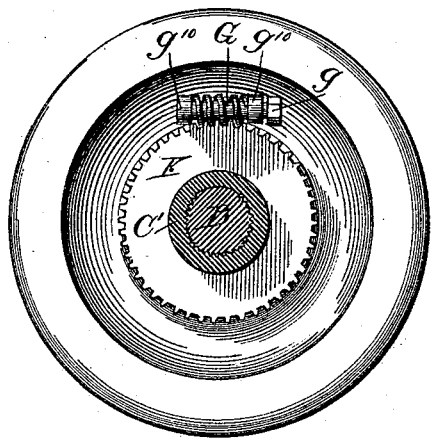
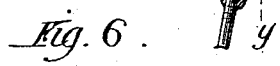
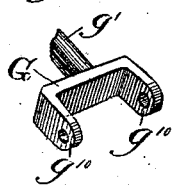
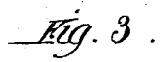
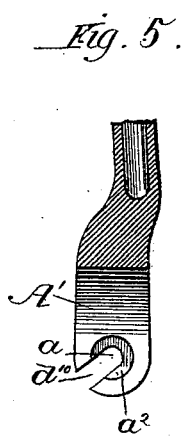
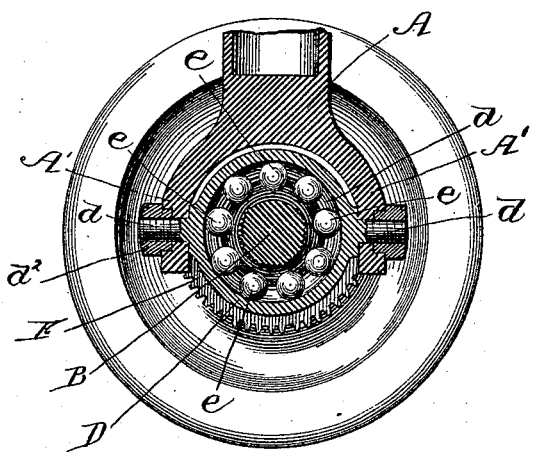
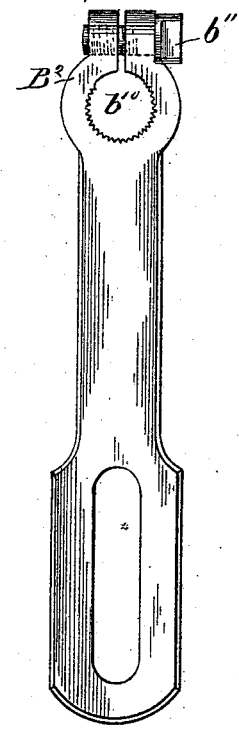
Witnesses:
Frank Blanchard
William F. Wiemer
Inventor:
Thos. B. Jeffery
By Chas. S. Burton
Attorney.
N. PETERS, Photo-Lithographer, Washington, D. C.

UNITED STATES PATENT OFFICE.

THOMAS B. JEFFERY, OF CHICAGO, ILLINOIS.

VELOCIPEDE.

SPECIFICATION forming part of Letters Patent No. 355,321, dated January 4, 1887.

Application filed April 17, 1886. Serial No. 199,218. (No model.)

*To all whom it may concern:*

Be it known that I, THOMAS B. JEFFERY, a citizen of the United States, residing at Chicago, in the county of Cook and State of Illinois, have invented certain new and useful Improvements in Axle-Bearings, which are fully set forth in the following specification, reference being had to the accompanying drawings, wherein—

Figure 1 is an axial section; Fig. 2, an outside sectional elevation, the section being made through $x\ x$, Fig. 1, and parts outside of that plane omitted. Fig. 3 is an outside sectional elevation, the section being made through $y\ y$, Fig. 1. Fig. 4 is a side elevation of the crank. Fig. 5 is a detail elevation of a countersunk gudgeon-bearing in the forked stem. Fig. 6 is a perspective of a bearing-bracket secured in the cavity of the hub.

A purpose of this invention is to provide a convenient means of adjusting the ball-bearings of the wheels of light-running vehicles, especially those of the class known as "cycles"—bicycles and tricycles, &c.

A is one branch of the fork or stem of the vehicle, being the fixed part or arm of the frame-work in which the wheel is to be journaled. It is hereinafter termed the "stem."

B is the axle.

B' and B² are, considered generically, stops on the axle, between which the other parts of the bearing are located. Specifically, one of them, B', forms the hub of the wheel, and the other, B², forms the head of the crank, (through which the power is applied to drive the vehicle.) I do not limit the application of my invention to the form in which said stops perform the specific functions named, for the wheel and the crank may be anywhere else on the axle, distinct and even distant from the stops; but as applied to the class of vehicle named, wherein compactness is desired, a specific feature of my invention consists in utilizing said stops for the specific purposes named.

C and C' are sleeves which slide on the axle B between the stops B' and B², and C', at least, should be secured against the possibility of revolving on the axle. This may be done in any well-known method which is equivalent to "feathering." I do it by serrating the axle and the interior surface of the sleeve, as seen in cross-section in Fig. 3. These two sleeves have their proximate ends beveled, as shown, to form the ball-bearing. They are encircled by the bearing-box D, having the interior annular groove, $d$, and containing and retaining upon the beveled ends of the sleeves the antifriction balls $e\ e\ e$.

The sleeve C' is exteriorly screw-threaded, and onto it is screwed the nut F, which is cogged on its outer rim, and on the stop B' are provided bearings $g^{10}$ for the endless screw G, which meshes into the cogged nut F. The endless screw G may be revolved in its said bearings by a wrench applied to its polygonal end or head $g$. The nut F, bearing against the stop B', upon being rotated in one direction by the engagement of the endless screw G in its cogged rim, will force the sleeve C' toward the balls and tighten the bearing, the sleeve C being immovable endwise by reason of the stop B², against which it bears. The opposite rotation of the endless screw, and consequent opposite rotation of the cogged nut, will separate the two sleeves, the nut in this movement bearing against the box D, which is stopped against the stop B². The cogged nut cannot get out of mesh with the endless screw, because there is only allowed between the stop B' and the box D space enough for the nut to turn on the sleeve without undue friction.

Certain details of structure are determined by the special application of this bearing to a bicycle, the stop B' becoming the hub of the wheel and the stop B² becoming the head or hub of the crank. These details will now be explained.

The hub being concaved and made to overhang the bearing-box D, and said box being pivoted in forked end of the stem A and being provided with the gudgeons $d\ d$ for that purpose, it is necessary to bend the fork of the stem aside, that it may pass under or into the concavity of the hub; and in order to connect it to the bearing-box after the latter is in place on the axle the bearings $a\ a$ of the gudgeons in the ends A' A' of the fork are slotted obliquely toward the same side toward which the fork is bent, so that the fork will pass onto the gudgeon and under the overhanging hub by the same oblique downward and sideward movement. In order to prevent accidental escape of the gudgeons from their bearings in the fork, I countersink the said bearings outside, as seen at $a^2$, Fig. 6, and thread the gudgeons, and provide the retaining-nuts $d^2$, which pass into the countersink $a^2$, and, preferably, the portion of the nuts $d^2$ which enters the countersink is round, either cylindrical or spherical, the exterior portion being polygonal or otherwise adapted to afford grasp for the wrench, and said round portion may fit the countersink snugly, and thus become the direct bearing for the fork. The excess of diameter of the portion of the nut which enters the countersink over the diameter of the gudgeon and of the slot $a^{10}$ serves to prevent the escape of the gudgeon from the bearings, and so keeps the box D connected to the fork.

I prefer to secure the crank-head B' to the axle by serrating the axle and the aperture $b^{10}$, in which it is inserted in the crank, and for further security I prefer to make the axle with a slight enlargement, $b$, at the end, and in order to get the crank over said enlargement I slit it from the aperture $b^{10}$ to the end, so that it may be spread to let it over the enlarged head of the axle, and provide the clamp-bolt $b^{11}$, to bind the outer ends and clamp it onto the axle, with their respective serrations intermeshed.

Since the wheel-hub is usually polished on the concave face, it is not practicable to cast or forge the bearings for the endless screw G on the hub, and I therefore make the small bracket G' with the stem $g'$, which I insert through a hole bored in the web of the hub and clamp it by a nut, $g^2$, on the outside.

I claim—

1. In combination, the axle having on it two rigid stops, the sleeves on the axle between the stops having their proximate ends beveled to form an adjustable bearing, and one of them non-revolving on the axle and exteriorly screw-threaded, the bearing-box encircling the sleeves, the cogged nut screwed onto the threaded sleeve between the bearing-box and one of the stops, and the endless screw journaled on said stop and engaging said nut, substantially as set forth.

2. In combination, the axle having rigid with it the wheel-hub, and a stop at a distance therefrom, the sleeves on the axle between the hub and said stop having their proximate ends beveled to form an adjustable bearing, and the one nearer the wheel-hub non-revolving on the axle and exteriorly screw-threaded, the bearing-box encircling the sleeves, the cogged nut screwed onto the threaded sleeve between the bearing-box and the hub, and the endless screw journaled on the hub and engaging the cogged nut.

3. In combination, the axle having on it two rigid stops, the sleeves on the axle between the stops having their proximate ends beveled to form an adjustable bearing, and one of them feathered on the axle and exteriorly screw-threaded, the bearing-box encircling the sleeves, and a nut screwed onto the threaded sleeve between the bearing-box and one of the stops and unattached to the latter, substantially as set forth.

4. In combination with the longitudinally grooved or serrated axle having an enlargement at the extreme outer end, the crank having the aperture for the axle correspondingly grooved, and rifted from said aperture to the end, whereby it may be spread to pass over the terminal enlargement of the axle, and a clamp-bolt to bind the rifted end and clamp it onto the serrated axle, substantially as set forth.

5. In combination with the axle and the bearing-box thereon, and the hub concaved and overhanging the bearing-box, which is provided with two opposite gudgeons, the stem forked to stride the box and inwardly bent to enter the concavity of the hub, and having bearings for the gudgeons slotted obliquely toward the end of the fork, whereby the gudgeons are inserted into their bearings by the same oblique movement by which the fork is passed into the concavity of the hub, substantially as set forth.

In testimony whereof witness my hand at Chicago, Illinois.

THOS. B. JEFFERY.

Attest:
CHAS. S. BURTON,
CHAS. S. NUROS.